US010459480B2

(12) United States Patent
Rasmussen

(10) Patent No.: US 10,459,480 B2
(45) Date of Patent: Oct. 29, 2019

(54) TOUCH-SENSITIVE SCREEN

(71) Applicant: Jens Rasmussen, Ulm (DE)

(72) Inventor: Jens Rasmussen, Ulm (DE)

(73) Assignee: e.Solutions GmbH (DE)

( * ) Notice: Subject to any disclaimer, the term of this patent is extended or adjusted under 35 U.S.C. 154(b) by 10 days.

(21) Appl. No.: 14/321,490

(22) Filed: Jul. 1, 2014

(65) Prior Publication Data

US 2015/0015808 A1 Jan. 15, 2015

(30) Foreign Application Priority Data

Jul. 12, 2013 (DE) ........................ 10 2013 012 110

(51) Int. Cl.
*G06F 3/041* (2006.01)
*G06F 1/16* (2006.01)
*G02B 1/14* (2015.01)

(52) U.S. Cl.
CPC ................ *G06F 1/16* (2013.01); *G06F 3/041* (2013.01); *B32B 2457/208* (2013.01); *G02B 1/14* (2015.01); *G06F 2203/04103* (2013.01)

(58) Field of Classification Search
None
See application file for complete search history.

(56) References Cited

U.S. PATENT DOCUMENTS

| | | | |
|---|---|---|---|
| 2004/0027339 A1 | 2/2004 | Schulz | |
| 2005/0237307 A1* | 10/2005 | Hieda | G06F 3/041 345/173 |
| 2006/0046078 A1* | 3/2006 | Richter | C03C 17/3411 428/447 |
| 2010/0028600 A1* | 2/2010 | Kojima | B29C 55/026 428/141 |
| 2011/0169767 A1* | 7/2011 | Weindorf | G02F 1/13338 345/174 |
| 2011/0226832 A1* | 9/2011 | Bayne | B28D 5/0011 225/2 |
| 2012/0068973 A1* | 3/2012 | Christiansson | G06F 3/0421 345/175 |
| 2012/0229423 A1* | 9/2012 | Takamiya | G02B 1/105 345/175 |
| 2012/0300307 A1* | 11/2012 | Borrelli | G02F 1/133502 359/609 |
| 2015/0009429 A1* | 1/2015 | Unno | G02F 1/1333 349/12 |
| 2015/0029412 A1* | 1/2015 | Kishioka | G06F 3/044 349/12 |

FOREIGN PATENT DOCUMENTS

| | | |
|---|---|---|
| DE | 10 2011 022 494 A1 | 7/2011 |
| DE | 20 2012 102 388 U1 | 9/2012 |
| DE | 20 2013 001 940 U1 | 5/2013 |
| EP | 1 058 205 A1 | 12/2000 |
| WO | WO 03/093879 A1 | 11/2003 |
| WO | WO 2010/035921 A1 | 4/2010 |

* cited by examiner

*Primary Examiner* — Joseph R Haley
(74) *Attorney, Agent, or Firm* — Tarolli, Sundheim, Covell & Tummino LLP

(57) ABSTRACT

A touch-sensitive screen, in particular for use in a motor vehicle, is described. The screen comprises a rigid cover layer with a roughened surface, a polarization layer arranged beneath the cover layer, a touch sensor layer arranged beneath the polarization layer, and a display of the touch-sensitive screen.

17 Claims, 3 Drawing Sheets

TOUCH-SENSITIVE SCREEN

RELATED APPLICATIONS

The present invention claims priority from German Patent Application No. 102013012110.8, filed 12 Jul. 2013, the entirety of which is incorporated herein by reference.

TECHNICAL FIELD

The present disclosure relates generally to the technical field of screens. The disclosure relates in particular to a touch-sensitive screen, for example for use in a motor vehicle.

BACKGROUND

The comfort of use and the visibility of a screen display, but also the appearance of a screen when it is switched off depend mostly on the prevailing lighting conditions. Reflections of ambient light on the surface of the screen are annoying for a viewer. This is the case especially with so-called glare, that is to say reflections of intensive local incident light, in the direction of the viewer. However, diffuse scattering of ambient light on the surface of a screen generally also has an adverse effect on the visibility and the aesthetic appearance of the screen display and of the screen.

When using portable display devices, such as, for example, notebooks or mobile telephones, and devices within the home, it is often easy for the user to influence the ambient lighting conditions or to suppress particularly annoying reflections by turning the device slightly. However, these possibilities exist to only a very limited extent in the case of fixed or removable displays installed in motor vehicles, such as, for example, navigation instruments or tablet PCs. While frequent changes of the surroundings or of the position of the vehicle can lead to a constant change in the ambient lighting conditions, it is at the same time often not possible, and generally also not desirable, for the driver or passenger to adjust the screen correspondingly frequently to the prevailing lighting conditions, for example by changing the orientation of the installed devices.

Possibilities for reducing annoying reflections on screen surfaces have already been known for a relatively long time. They include anti-reflection coatings as well as measures for avoiding glare, such as, for example, special anti-glare coatings or a roughening of the surface, as a result of which incident light is not reflected but is scattered diffusely.

In the forms known hitherto, roughened screen surfaces often appear greyish when the display is switched off owing to the passive scattering of ambient light, and this is perceived as unattractive by many users. At the same time, anti-glare and anti-reflection coatings can be used to only a limited extent for touch-sensitive screens, as are common in tablet PCs and automotive instruments, because of their sensitivity to fingerprints and their poor scratch resistance.

SUMMARY

There is therefore to be provided a touch-sensitive screen having good haptic properties, which screen exhibits low reflection of ambient light.

According to a first aspect there is provided a touch-sensitive screen. The screen comprises a rigid cover layer with a roughened surface, a polarization layer arranged beneath the rigid cover layer, a touch sensor layer arranged beneath the polarization layer, and a display of the touch-sensitive screen.

The thickness of the rigid cover layer can be between 0.2 and 1.8 millimeters, for example between 0.55 and 1.1 millimeters. The thickness of the polarization layer can be between 185 and 425 micrometers, for example between 250 and 400 micrometers.

The surface of the rigid cover layer can have an average roughness between $S_a$=0.1 and 2 micrometers. Alternatively or in addition, the following can apply for the average roughness: $-2<S_{sk}<2$ and/or $-3.5<S_{ku}<3.5$. For example, the roughness can be between $S_a$ 0.17 and 0.25 micrometers (for example with $-0.2<S_{sk}<0.2$ and/or with $S_{ku}$ between 2.0 and 3.5, such as $S_{ku}$ between 0 and 4.0, optionally with an at least approximately Gaussian distribution). Alternatively or in addition, the profile depth of the surface roughness can be between 2 and 30 micrometers, for example between 4 and 12 micrometers.

The roughness can be adapted to the resolution of the screen display according to subjective judgement on the basis of the surface gloss. Thus, a higher resolution can be accompanied by a lower roughness. The roughness can correspond to a gloss between 15 and 150, for example between 20 and 30, gloss units, GU. The gloss can be measured at an angle of 60 degrees for gloss units between 20 and 70. Above 80 gloss units, a measurement angle of 20 degrees can be used.

The rigid cover layer may be made using chemical strengthening. A depth of (compressive stress) layer, DOL, of the rigid cover layer may approximately range between 20 and 70 micrometers. As an example, the DOL may amount to approximately 25 to 40 (e.g., 30 micrometers).

The roughness can be achieved by etching and/or sandblasting. Additionally or alternatively, moulding of the rigid cover layer (e.g. by means of a suitable extrusion die) is also possible. The surface of the rigid cover layer can additionally have an anti-fingerprint coating. The thickness of the anti-fingerprint coating can be between 1.5 and 20, for example between 3 and 15, nanometers.

The rigid cover layer can comprise glass. Additionally or alternatively, the rigid cover layer can comprise plastic, for example polycarbonate, polyethylene terephthalate or polymethyl methacrylate. The rigid cover layer can comprise laminated glass and/or chemically toughened glass.

The polarization layer can comprise a linear or circular polarizer. The circular polarizer can comprise a linear polarizer and an underlying $\lambda/4$ layer for a wavelength in the visible light spectrum. In addition, a $\lambda/2$ layer can be arranged beneath the polarization layer. For wavelengths that differ from a reference wavelength (of e.g. 550 nanometers) of the $\lambda/4$ layer, the $\lambda/2$ layer can serve to compensate for wavelength-dependent properties of the $\lambda/4$ layer.

The touch sensor layer can comprise an inductive, resistive or capacitive touch sensor. Furthermore, the touch sensor layer, in dependence on the polarizer(s) used, can be applied to an isotropic plastics film.

The touch-sensitive screen can comprise a second polarization layer which is arranged beneath the touch sensor layer. The second polarization layer can have a linear or circular polarizer.

In the case of the touch-sensitive screen, the polarization properties of each polarization layer and the position of each polarization layer in the screen can exhibit no significant impairment after five hundred hours' continuous exposure to an ambient temperature of 60° C. at a relative humidity between 92 and 95% and/or after five hundred hours' continuous exposure to an ambient temperature of 95° C. These components can accordingly fulfill important quality requirements for use in a motor vehicle.

The touch sensor layer can be bonded by optical bonding to the polarization layer located above it. Additionally or alternatively, the touch sensor layer can be bonded by optical bonding to the underlying layer or can be separated therefrom by an air gap.

The touch-sensitive screen can be part of an instrument or instrument system (including an infotainment system, a navigation system and/or a cockpit system) in a motor vehicle. Alternatively or in addition, the touch-sensitive screen can be part of a tablet PC for installation in a motor vehicle. The tablet PC can be fixedly or removably installed in the vehicle.

According to a second aspect there is provided a tablet PC comprising the touch-sensitive screen provided herein.

According to a third aspect there is provided a touch-sensitive screen. The touch-sensitive screen comprises a glass layer provided by way of surface, with a thickness between 20 μm and 400 μm, a flexible backing layer, a surface adhesive layer, the surface adhesive layer connecting the glass layer to the backing layer two-dimensionally, a rigid cover layer arranged beneath the backing layer, a polarization layer arranged beneath the rigid cover layer, a touch sensor layer arranged beneath the polarization layer, and a display of the touch-sensitive screen.

According to a fourth aspect there is provided a touch-sensitive screen. The touch-sensitive screen comprises a glass layer provided by way of surface, with a roughened surface and a thickness between 20 μm and 400 μm, a rigid cover layer arranged beneath the glass layer, a surface adhesive layer which exhibits a thickness between 5 μm and 600 μm and also a hardness between 0 Shore A and 60 Shore A, the adhesive layer connecting the glass layer to the rigid cover layer two-dimensionally, a polarization layer arranged beneath the rigid cover layer, a touch sensor layer arranged beneath the polarization layer, and a display of the touch-sensitive screen.

BRIEF DESCRIPTION OF THE DRAWINGS

Further advantages, details and features of the device described herein will become apparent from the following description of exemplary embodiments and from the figures, in which:

FIG. 3a shows a schematic representation of a third exemplary embodiment of a touch-sensitive screen having, above the rigid cover layer, a surface composite with a roughened surface;

FIG. 3b shows a schematic illustration of the fracture behaviour of the screen according to FIG. 3a;

FIG. 4a shows a schematic representation of a fourth exemplary embodiment of a touch-sensitive screen having, above the rigid cover layer, a surface composite with a roughened surface; and FIG. 4b shows a schematic illustration of the fracture behaviour of the screen according to FIG. 4a.

DETAILED DESCRIPTION

Figure 1:
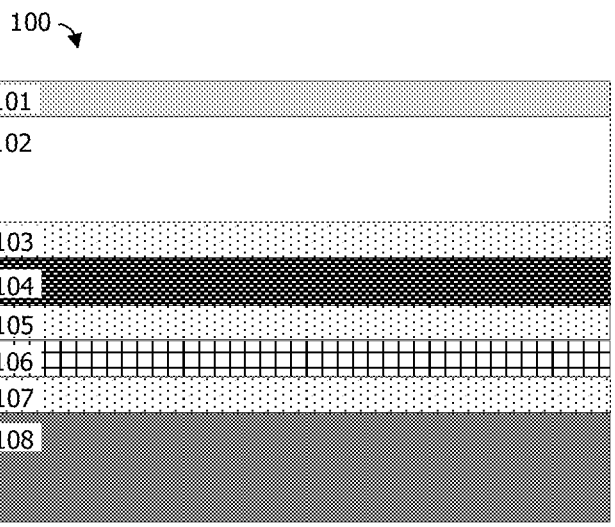
FIG. 1 shows a schematic representation of a first exemplary embodiment of a touch-sensitive screen having an uppermost rigid cover layer and an underlying polarizer, the surface of the rigid cover layer being roughened.

FIG. 1 shows a schematic view of an exemplary embodiment of a touch-sensitive screen 100, e.g., for use in a motor vehicle. The motor vehicle can be a car, but also a railway vehicle or aircraft.

In the exemplary embodiment shown in FIG. 1, the touch-sensitive screen 100 comprises a rigid cover layer 102 with a roughened surface 101 and a layer thickness of approximately 0.8 or 1.0 millimeter, a polarization layer 104 with a thickness of 375 micrometers arranged beneath the rigid cover layer 102, a touch sensor layer 106 arranged beneath the polarization layer 104, and a display 108 of the touch-sensitive screen 100. The mentioned layers are bonded together by adhesive layers, comprising a first 103, a second 105 and a third adhesive layer 107.

In order to avoid reflections, the surface 101 of the rigid cover layer 102 is roughened. This additionally leads to an improvement in the haptic properties of the surface 101 because, on touching the screen, a finger moves more easily over a roughened surface (and more precise control of the touch function is accordingly possible) than over a high-gloss, that is to say smooth, surface optionally provided with an optical coating, to which a finger often appears to stick when it is moved.

Because the roughening of the surface 101 also affects the transmitted light of the display 108, the chosen roughness is in one variant adapted to the resolution of the display 108 in order to optimize the screen display. An average roughness in the range between $S_a=0.17$ and 0.25 micrometers, e.g., between 0.188 and 0.192 micrometers, with $-0.2<S_{sk}<0.2$ and with $2.8<S_{ku}<3.2$, optionally with an at least approximately Gaussian distribution, has been found to be suitable, but positive results are to be achieved for a broader roughness range of approximately between $S_a=0.1$ and 2 micrometers with $-2<S_{sk}<2$ and/or with $0<S_{ku}<4.0$ as well as for a profile depth $S_z$ between 2 and 30 micrometers.

The average roughness can be adapted to the (e.g., target or maximum) resolution of the screen display according to subjective judgement on the basis of the surface gloss. Thus, a higher resolution is usually accompanied by a lower roughness. A roughness corresponding to a gloss between 20 and 150 gloss units, GU, e.g., around 40 GU, has been found to be suitable. Moreover, in connection with the sparkling characteristics of the surface, a Gaussian distribution of the roughness parameters was found to be advantageous.

In the exemplary embodiment, this roughness is achieved by etching the rigid cover layer 102. In that case the roughness of the surface typically increases, and its GU drops, with an increasing duration of the etching process. Sandblasting and/or moulding of the rigid cover layer 102 from a production mould having a roughened surface are, however, also possible production processes. The haptic properties of the rough surface 101 can additionally be improved further by applying an anti-fingerprint coating (not shown).

Because the rigid cover layer 102 is uppermost, the touch-sensitive screen 100 may pose a risk of injury when installed in the motor vehicle if the rigid cover layer 102 consists of conventional glass. The safety of the screen 100 can effectively be increased if plastic (such as, for example, polycarbonate, polyethylene terephthalate or polymethyl methacrylate), laminated glass or chemically toughened glass is used as the material for the rigid cover layer 102. In the case of chemically strengthened glass, for example, a depth of layer, DOL, of approximately 30 micrometers was found compatible with the roughness characteristics as described above without causing unacceptable bending of the surface. The glass was also found to satisfy the requirements of common head impact tests and thus to be crash safe. The fracture properties of the rigid cover layer 102 can at the same time be influenced by the chosen thickness of the rigid cover layer 102.

It has been shown that, by means of the described roughness of the surface layer 101 and by application of an anti-fingerprint coating (e.g. with a layer thickness of approximately 10 nanometers), very good haptic properties can be achieved even when plastic is used as the material for the rigid cover layer 102.

In the exemplary embodiment according to FIG. 1, the polarization layer 104 beneath the rigid cover layer 102 serves to absorb incident light. The use of circular polarizers, comprising a linear polarizer in conjunction with an underlying $\lambda/4$ layer for a wavelength in the middle visible light spectrum, already shows very good results. These can be improved further, e.g., in relation to a broadened absorption spectrum, if a $\lambda/2$ layer is additionally arranged beneath the $\lambda/4$ layer of the polarization layer 104. For example, the usual red or blue sheen of screens when the display 108 is switched off can thereby be reduced in particular.

The touch sensor layer 106, in dependence on the polarization layer 104 used, can be applied to an isotropic plastics film. In the exemplary embodiment according to FIG. 1, the touch sensor layer 106 is firmly embedded by means of a second 105 and third adhesive layer 107 between the polarization layer 104 and the display 108 of the touch-sensitive screen 100. While such bonding of the touch sensor layer 106 both at the top and at the bottom is advantageous for the optical and mechanical properties of the screen 100, it would also be possible in an alternative embodiment to omit the third adhesive layer 107 and replace it with an air gap. This would simplify the production of the touch-sensitive screen 100. In addition, in order to improve the optical properties, each of the adhesive layers 105, 107 used can be produced by optical bonding, that is to say by a bond that minimises disruptive optical interface phenomena between the layers.

In the exemplary embodiment, the touch sensor layer 106 comprises a capacitive touch sensor. However, alternative embodiments can also provide different types of sensor. In addition, the display 108 is a conventional liquid crystal panel. Here too, however, alternative embodiments can provide different display systems, such as a liquid crystal panel with an OLED backlight unit or an OLED display panel.

A use of the touch-sensitive screen 100 shown in FIG. 1 for installation in a motor vehicle requires high resistance to extreme temperatures and temperature variations as well as to humidity and humidity variations. Requirements made of screens for installation as standard in motor vehicles provide that the optical and mechanical properties of the screen and its components, e.g., the polarizers, do not exhibit noticeable impairment even after at least 500 hours' continuous exposure to an ambient temperature of 60° Celsius at a relative humidity between 92 and 95 percent or after at least 500 hours' continuous exposure to an ambient temperature of 95° Celsius. For an installation of the touch-sensitive screen 100 in a motor vehicle, therefore, the screen components and the processing thereof to form the screen 100 can be so chosen that they satisfy the mentioned requirements. It will be appreciated that alternative or additional requirements can also be made.

On account of the haptic preferences, the touch-sensitive screen 100 shown in FIG. 1 is based on a screen structure with the rigid cover layer 102 uppermost, while the known disadvantages of this structural design of high surface reflectivity are at the same time eliminated by an appropriate roughening of the surface. While risks of injury when this screen 100 is used in a motor vehicle are excluded by a particular choice of material for the rigid cover layer 102, it has at the same time been shown that, as a result of the mentioned structuring of the surface 101, these materials do not strongly affect the haptic perception when the touch function of the screen 100 is used. In fact, in particular by the additional application of an anti-fingerprint coating, considerably easier gliding of the finger over the surface 101 can be achieved than is the case with high-gloss screen surfaces. In addition, it has been shown that the combination of the roughened surface 101 with an underlying circular polarizer (see layer 104), which can additionally be supplemented by an underlying $\lambda/2$ layer, leads to a deep-black appearance of the touch-sensitive screen 100 when the display 108 is switched off.

As a result of the described properties of the touch-sensitive screen 100, it is suitable, e.g., as part of an instrument or instrument system in a motor vehicle, such as, for example, an infotainment system or a navigation system. The screen 100 is also suitable as part of a motor vehicle cockpit system (e.g. for displaying the speed and/or engine speed) and/or tablet PC for installation in a motor vehicle. The safety of the screen 100 permits installation in the preferred visual range, directly in front of the seat of a vehicle occupant (e.g. on the back of a driver's seat and/or passenger seat). Further fields of application of the touch-sensitive screen 100 are, however, not excluded.

Figure 2:
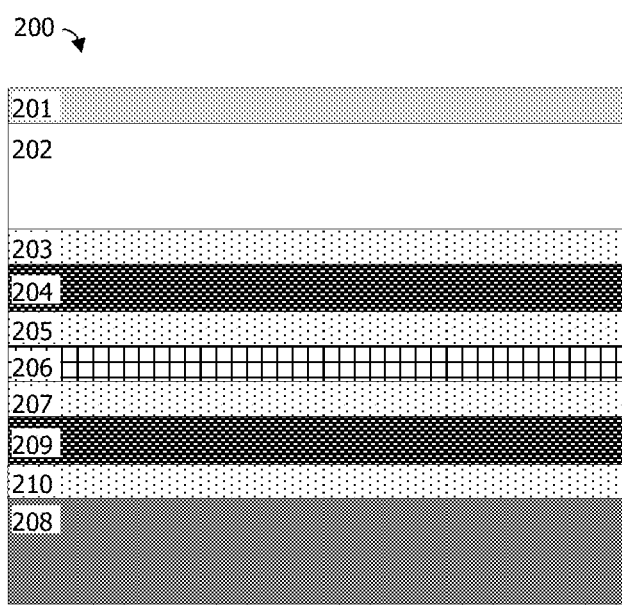
FIG. 2 shows a schematic representation of a second exemplary embodiment of a touch-sensitive screen having two polarizers beneath the rigid cover layer.

FIG. 2 shows a schematic view of a second exemplary embodiment of a touch-sensitive screen 200 for use in a motor vehicle. Corresponding to the touch-sensitive screen 100 of FIG. 1, the touch-sensitive screen 200 of FIG. 2 also comprises a rigid cover layer 202 with a roughened surface 201, which is bonded by means of a first adhesive layer 203 to an underlying polarization layer 204, which in turn is bonded by means of a second adhesive layer 205 to a touch sensor layer 206. Unlike the touch-sensitive screen 100 according to FIG. 1, however, the screen 200 of FIG. 2 also comprises beneath the touch sensor layer 206 a second polarization layer 209, which is embedded by means of a third 207 and fourth adhesive layer 210 between the touch sensor layer 206 and the display 208 of the screen 200.

It has been shown that the second polarization layer 209, which can in turn comprise a circular polarizer, further improves the reflection properties as compared with the screen 100 of FIG. 1 to the effect that the screen 200 has a deep-black appearance when the display 208 is switched off. For example, the shimmering colours that are otherwise usual are reduced to such an extent that they are no longer noticeable.

The mode of operation of the described touch-sensitive screens 100, 200 is based inter alia on an interaction between the nature (e.g. roughness) of the surface 101, 201 and the material of the rigid cover layer 102, 202 with absorption properties of underlying polarization layers 104, 204, 209 as well as the combination of the layers with one another. It is clear that, in a departure from the described exemplary embodiments, the described mode of operation can also be achieved by alternative embodiments, e.g., by incorporating further material layers into the screen structure.

Figure 3:
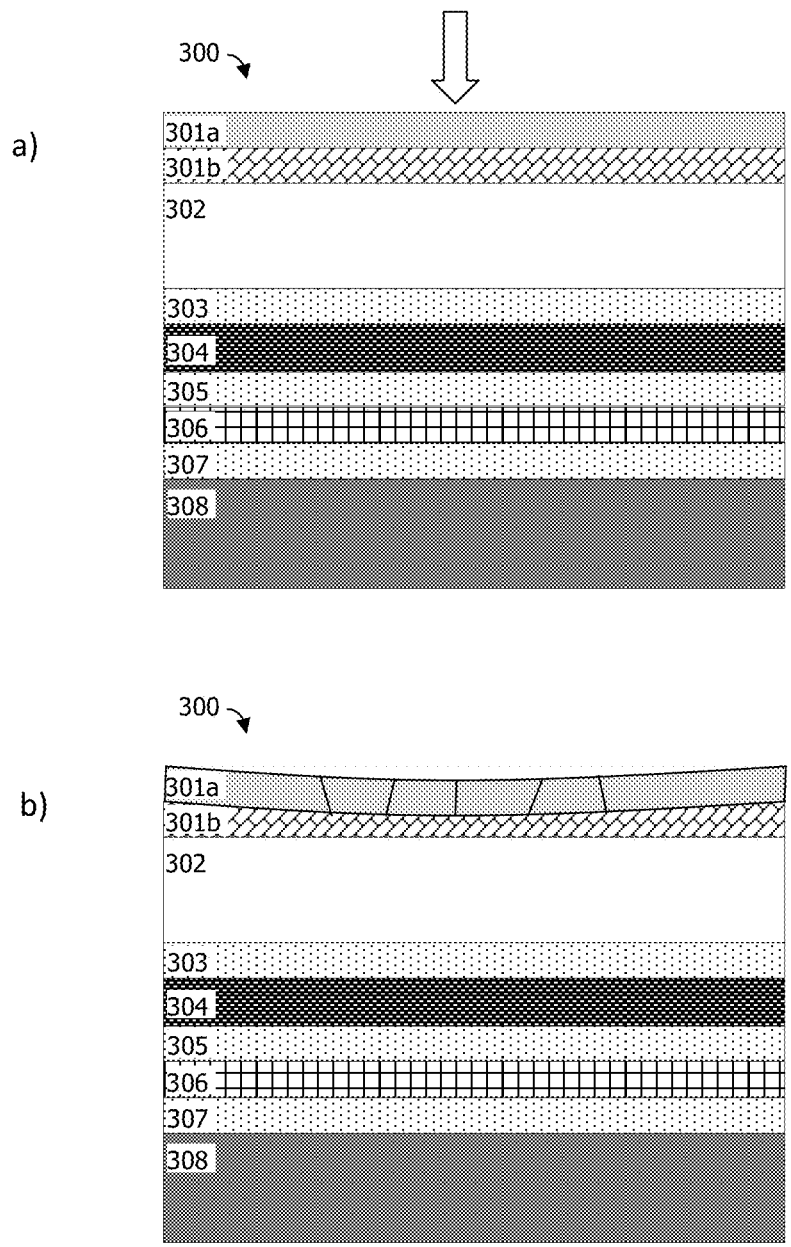

FIG. 3a shows a schematic view of a third exemplary embodiment of a touch-sensitive screen 300. The screen 300 is optimized for good haptic and aesthetic properties in combination with low reflection of ambient light, while also fulfilling the durability and safety requirements as posed by the use in for example a motor vehicle.

Similar to the touch-sensitive screen 100 of FIG. 1, the touch-sensitive screen 300 of FIG. 3a comprises a rigid cover layer 302 bonded by means of a first adhesive layer 303 to an underlying polarization layer 304, which in turn is bonded by means of a second adhesive layer 305 to a touch sensor layer 306. Further in correspondence to the previous examples, a third adhesive layer 307 connects the touch sensor layer 306 to a display 308. Unlike the previous examples of the touch-sensitive screens 100, 200, the screen 300 of FIG. 3a further comprises a transparent glass layer 301a with a roughened surface and a surface adhesive layer 301b which connects the glass layer 301a to the rigid cover layer 302. Moreover, the rigid cover layer 302 does not necessarily have a roughened surface.

Although the shown components 303-308 underneath the rigid cover layer 302 resemble those of the screen 100 of FIG. 1, it will be appreciated that the described variation in the upper layers of the screen 300 can be applied also to the screen 200 of FIG. 2.

In connection with the above described touch-sensitive screens 100, 200, it has been said that the rigid cover layer 102, 202 can be made of a variety of materials, such as glass or plastic. For devices used for example in vehicles, use is mostly made of non-splintering plastic instead of glass for the cover layer, in order to fulfill safety requirements. It is further possible to cover the cover glass of the display with a cut-resistant plastic film. In the event of a fracture of the cover glass, for instance by virtue of the impingement of an occupant of the vehicle in the event of an accident, this plastic film serves to reliably hold in check the shards and fragments arising underneath.

Plastic surfaces are sometimes considered to be less visually appealing and inferior in comparison with glass. In addition, plastic surfaces may not be sufficiently scratch-resistant, especially in the case of a touch function of the display. With the use of restraining plastic films by way of covering, a further factor is that such surfaces wear out easily and an optical antireflection coating of the films is costly or, once again, is not compatible with a touch function of the display.

The screen 300 of FIG. 3a combines the advantages of a glass surface while keeping the risk of injuries at a minimum. In addition, the previously described optical advantages of a roughened surface in combination with a polarizer and further elements underneath the cover layer can also be realized for the screen 300. Given sufficiently thin design of the glass layer 301a, said layer exhibits a relatively high flexibility and hence pliability. Hence the risk of damage to the glass layer 301a by the customary operational loading (for instance, for a video screen with touch function) falls. At the same time, in the event of a possible fracture of the glass layer 301a as a result of an impingement a risk of injury by the fragments arising is diminished by reason of the pliability thereof. In addition, given sufficiently low rigidity of the glass layer 301a and, at the same time, sufficiently firm adhesion of the glass layer 301a to the rigid cover layer 302 with the aid of the surface adhesive layer 301b, in the event of a smashing of the glass layer 301a the fracture edges of the glass layer 301a cannot project far from the surface in a manner entailing a risk of injury. Further, on account of the thin design of the glass layer 301a it is not possible for shards of a thickness entailing a risk of injury to erupt from the material thickness of the glass layer 301a.

FIG. 3b shows a schematic representation of the fracture behaviour of the screen 300 according to FIG. 3a under the influence of the force represented by the arrow in FIG. 3a. Instead of protruding shards and edges, the smashed glass layer 301a exhibits, very largely, vertical fractures or cracks through the entire layer thickness, the fragments of the glass layer 301a that are formed being effectively held in the surface composite 300 by the surface adhesive layer 301b situated below said glass layer 301a.

In one variation the screen 300 further comprises a flexible backing layer embedded into the surface adhesive layer 301b. Given that the flexible backing layer has tear-resistant and cut-resistant properties, it will serve to better prevent a protrusion of fracture edges in the event of a fracture of the rigid cover layer 302. This happens by virtue of the fact that shards and fracture edges of the smashed rigid cover layer 302 are held in check with the aid of the affixed tear-resistant and cut-resistant backing layer. For the backing layer, a thickness between 50 µm and 500 µm, e.g., between 100 µm and 300 µm, proved appropriate.

For the described fracture behaviour of the glass surface the interaction of low rigidity of the glass layer 301a and high strength of the underlying adhesive bond with the aid of the surface adhesive layer 301b is essential. In order to guarantee sufficient accident safety, the glass layer 301a has been designed to be sufficiently thin. At the same time, the use of the screen 300 with touch function makes demands as regards a mechanical minimal load-bearing capacity of the glass layer 301a.

A layer thickness between 50 µm and 200 µm for the glass layer 301a has proved expedient. Whereas, in addition, the use of borosilicate glass has proved worthwhile, other glasses, e.g., chemically hardened glasses, can also be used for the glass layer 301a. Generally suited are, for example, glass types Schott D263, Schott Xensation, Asahi Dragontrail and Corning Gorilla I/II/III.

The specifications of the surface adhesive layer 301b also result from the properties of the glass layer 301a being used. In this connection, a hardness of the surface adhesive layer 301b between 0 Shore A and 60 Shore A, for example between 15 Shore A and 45 Shore A, and also a thickness of the surface adhesive layer 301b of about 100 µm to 400 µm has been shown to be advantageous. Positive results can, however, be achieved for a thickness of the surface adhesive layer 301b within the range between 5 µm and 500 µm. Suitable as adhesive are adhesives based on acrylic or silicone. Furthermore, the first adhesive layer may take the form of a composite consisting of two or more adhesive laminations.

Figure 4:
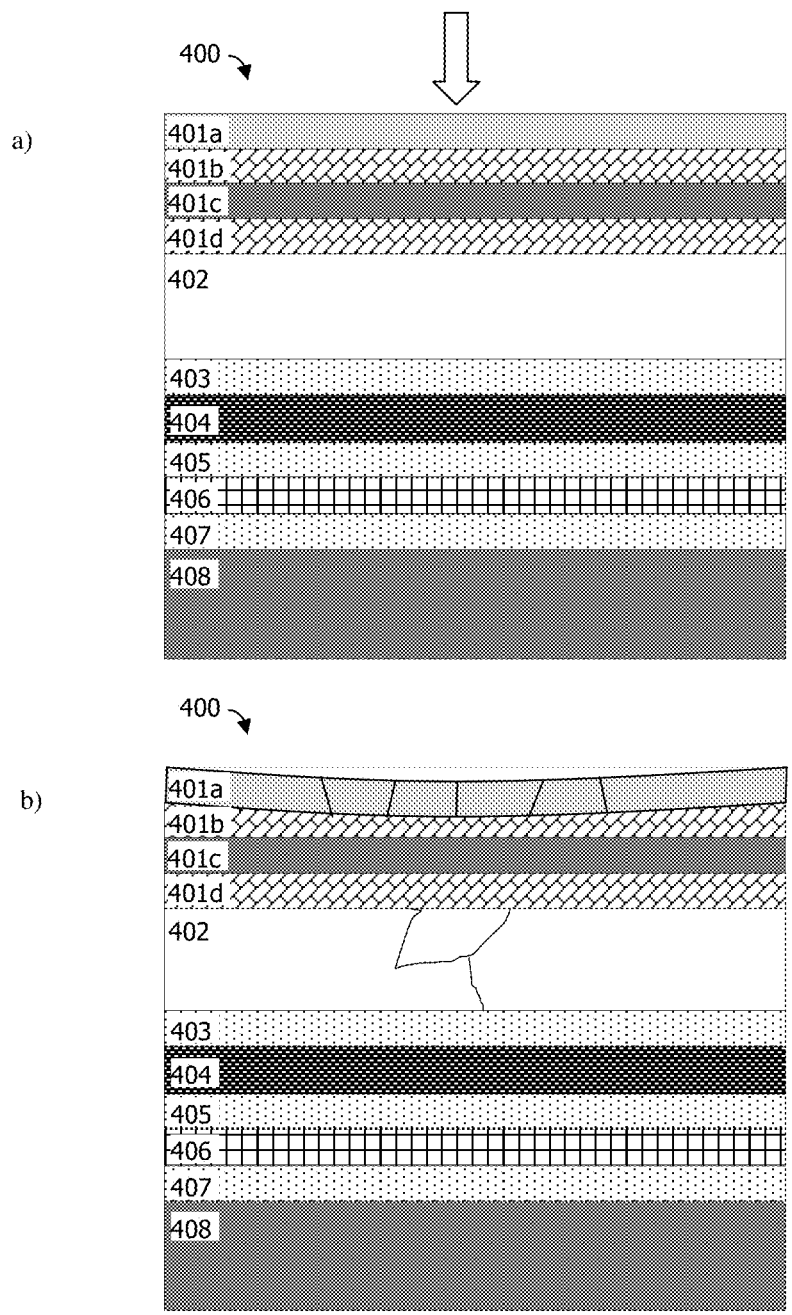

FIG. 4a shows a schematic view of a fourth exemplary embodiment of a touch-sensitive screen 400 suitable for use in a motor vehicle. The components 402-408 in the lower parts of the screen 400 correspond to the components 302-308 of the screen 300 of FIG. 3a, respectively. Moreover, similar to the screen 300 of FIG. 3a the screen 400 of FIG. 4a comprises a transparent glass layer 401a with a roughened surface and a first surface adhesive layer 401b which connects the glass layer 301a to a surface beneath. What has been said above with respect to these components therefore equally applies to the screen 400 of FIG. 4. However, the screen 400 differs from the screen 300 as it further comprises a transparent flexible backing layer 401c embedded between the first surface adhesive layer 401a and a second surface adhesive layer 401d underneath the flexible backing layer 401c.

FIG. 4b shows a schematic representation of the fracture behaviour of the screen 400 according to FIG. 4a under the influence of the force represented by the arrow in FIG. 4a. Different from the screen 300 of FIG. 3b, in the present case the backing layer 401c further helps to prevent shards of the broken rigid cover glass 402 to penetrate through the surface of the screen 400.

The invention claimed is:

1. A touch-sensitive screen comprising:
   a rigid cover layer with a roughened surface directly formed thereon, wherein the rigid cover layer is a glass substrate,
   a polarization layer arranged beneath the rigid cover layer and bonded to an underside of the rigid cover layer by means of an adhesive layer,
   a touch sensor layer arranged beneath the polarization layer, and
   a display of the touch-sensitive screen.

2. The touch-sensitive screen according to claim 1, wherein the surface of the rigid cover layer has an average roughness between Sa=0.1 and 2 micrometers.

3. The touch-sensitive screen according to claim 1, wherein the surface of the rigid cover layer has an average roughness in accordance with at least one of $-2<S_{sk}<2$ and $0<S_{ku}<4.0$.

4. The touch-sensitive screen according to claim 1, wherein a profile depth of a surface roughness of the roughened surface is between 2 and 30 micrometers.

5. The touch-sensitive screen according to claim 1, wherein the roughened surface has a roughness corresponding to a gloss between 15 and 150 gloss units, GU.

6. The touch-sensitive screen according to claim 1, wherein the rigid cover layer has a depth of layer, DOL, between 20 and 70 micrometers.

7. The touch-sensitive screen according to claim 1, wherein the rigid cover layer comprises glass and/or laminated glass.

8. The touch-sensitive screen according to claim 1, wherein the rigid cover layer comprises chemically toughened glass.

9. The touch-sensitive screen according to claim 1, wherein the polarization layer comprises a circular polarizer.

10. The touch-sensitive screen according to claim 9, wherein a $\lambda/2$ layer for a light wavelength in the visible range is arranged beneath the polarization layer.

11. The touch-sensitive screen according to claim 1, further comprising a second polarization layer, wherein the second polarization layer is arranged beneath the touch sensor layer.

12. The touch-sensitive screen according to claim 1, wherein the touch sensor layer is bonded by optical bonding to the polarization layer located above it.

13. The touch-sensitive screen according to claim 1, wherein the touch sensor layer is bonded by optical bonding to the underlying screen component or is separated therefrom by an air gap.

14. The touch-sensitive screen according to claim 1, wherein the touch-sensitive screen is part of an instrument or instrument system in a motor vehicle.

15. The touch-sensitive screen according to claim 1, wherein the touch-sensitive screen is part of a tablet PC for installation in a motor vehicle.

16. Tablet PC comprising a touch-sensitive screen according to claim 1.

17. The touch-sensitive screen of claim 1, wherein the thickness of the rigid cover layer is between 0.55 and 1.1 millimeters.

* * * * *